United States Patent [19]

Sheiman

[11] Patent Number: 4,871,233

[45] Date of Patent: Oct. 3, 1989

[54] THIN PLATE PRISM AND STEREOSCOPIC SYSTEM

[76] Inventor: David M. Sheiman, 1401 Alvarado Ter., Los Angeles, Calif. 90006

[21] Appl. No.: 49,313

[22] Filed: May 12, 1987

[51] Int. Cl.$^4$ .......................... G02B 5/04; G02B 3/08
[52] U.S. Cl. .................................. 350/286; 350/452; 350/132; 350/167
[58] Field of Search ................ 350/286, 452, 132, 167

[56] References Cited

U.S. PATENT DOCUMENTS

| 1,872,501 | 8/1932 | Rehländer | 350/413 |
| 2,510,344 | 6/1950 | Law | 350/452 |
| 4,274,714 | 6/1981 | Okamura | 350/452 |
| 4,588,259 | 5/1986 | Sheiman | 350/132 |
| 4,688,905 | 8/1987 | Okamura | 350/540 |

FOREIGN PATENT DOCUMENTS 0166931  8/1985  Japan .................................. 350/452

OTHER PUBLICATIONS

Xerox Disclosure Journal, "Fresnel Lens Concept for Projecting Slides", Price & Spurles, vol. 4, No. 5, pp. 665–656, Sept./Oct. 1979.
Feigenblatt, "Variable Gain Diffusing Optical Projection Screens", IBM Technical Disclosure Bulletin, vol. 27, No. 5, Oct. 1984, pp. 3031.
Research Disclosure No. 21036, "Optical Device for Collecting Light from a Scanned Line in a Single Point", Oct. 1981, pp. 380.

Primary Examiner—Bruce Y. Arnold
Assistant Examiner—Terry S. Callaghan
Attorney, Agent, or Firm—Plante, Strauss & Vanderburgh

[57] ABSTRACT

There is disclosed a thin plate optical element of the Fresnel type having refracting and magnifying properties. One face of the thin plate element is formed with a plurality of straight line, parallel and evenly spaced triangular prisms and the opposite face of the element has a plurality of coaxial, arcuate prisms of varied face angles in a progressive order of decreasing face angles extending outwardly from the center of the optical element. The arcuate prisms can be a single, continuous helical prism with a continuously variable and decreasing face angle along its length from the center of the element or, preferably, can be a plurality of concentric circular prisms of incrementally increasing diameter and decreasing face angles. One face of the optical element thus functions as a magnification lens while the other face of the optical element functions to refract the stereoscopic images the necessary degree for fusing of these images into a single three dimensional illusion. The element is used in a stereoscopic viewing system, positioned in front of a display of the stereoscopic images which are viewed through a pair of eyepieces with the necessary optical elements for creating the three dimensional illusion.

16 Claims, 3 Drawing Sheets

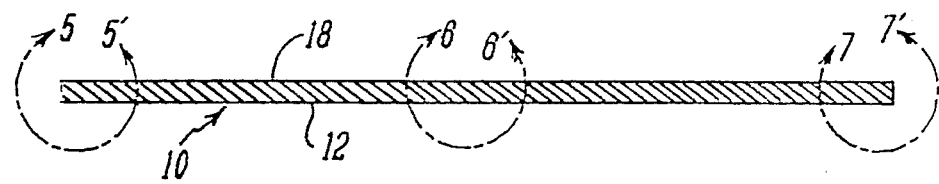
*FIGURE 4*
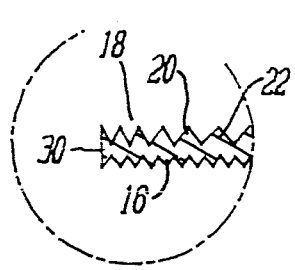 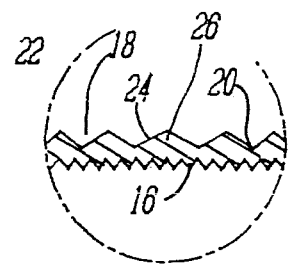 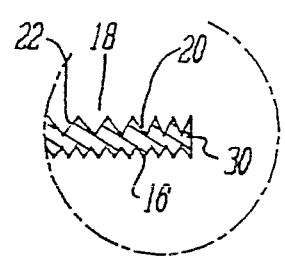
*FIGURE 5*   *FIGURE 6*   *FIGURE 7*
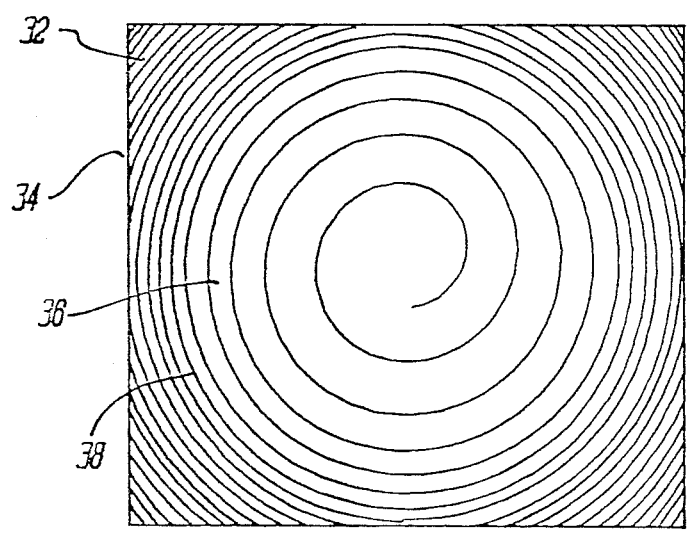
*FIGURE 8*

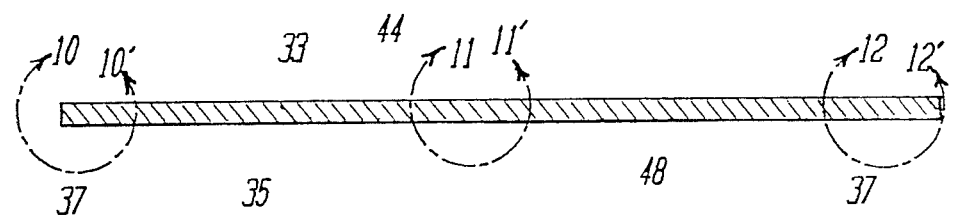
FIGURE 9
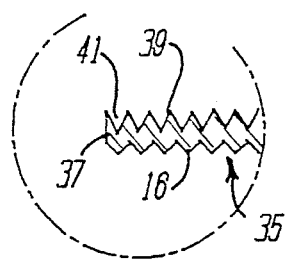 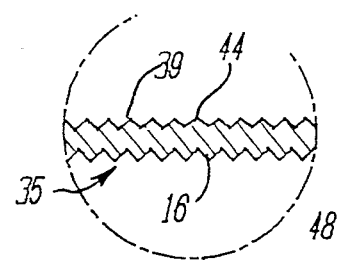 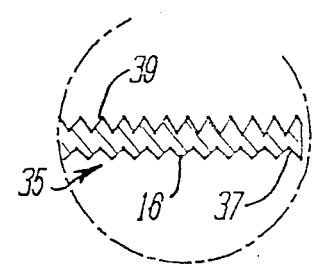
FIGURE 10　　FIGURE 11　　FIGURE 12
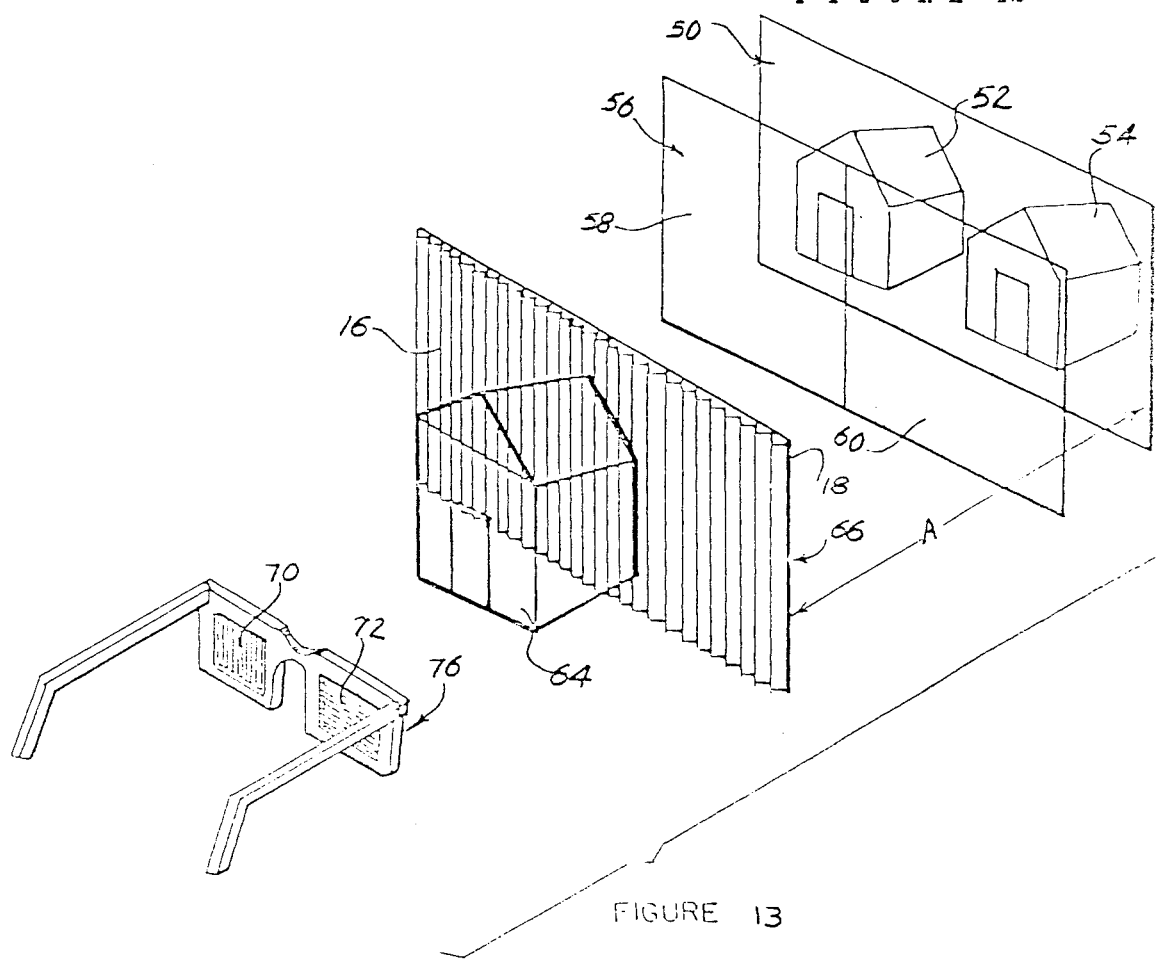
FIGURE 13

THIN PLATE PRISM AND STEREOSCOPIC SYSTEM

FIELD OF THE INVENTION

This invention relates to an optical prism and lens and, in particular, to a thin plate, Fresnel refracting and magnifying optical element useful in a stereoscopic imaging system, and to a stereoscopic imaging system using that optical element.

BRIEF STATEMENT OF THE PRIOR ART

Sheiman and Rudell in U.S. Pat. Nos. 4,235,515 and 4,222,720 describe stereoscopic image display with one or two Fresnel prisms. These systems, however are best suited for viewing by one or two observers, and require display of left and right images at ninety degrees to each other, thus restricting usage and complicating monitor displays. These systems also are not readily adaptable to display of large images. The patents describing this system do not mention or claim light encoding of any kind for image discrimination. Discrimination by an observer of each stereoscopic image is achieved by light refraction or reflection, resulting in critical positioning of the observer for correct viewing.

Swan, in U.S. Pat. No. 51,906 issued in 1866 discloses a stereoscopic image display using two, solid core, right angle prisms. This system has the same limitations as the aforementioned Sheiman and Rudell patents and, additionally is very bulky and cumbersome, which further limits the size of the images. This system is entirely incompatible with single monitor (CRT) displays.

Baumgardner, in U.S. Pat. No. 3,972,596, describes a system utilizing a flat Fresnel lens for image magnification or compression, as in a wide angle lens application. Baumgardner uses Fresnel optics for a single image, and has no suggestion of image pairs for any purpose, particularly stereoscopy. In my prior patent, U.S. Pat. No. 4,582,393, I disclose a stereoscopic viewing system which employs a pair of stereoscopic images in adjacent array which are encoded with polarizing filters and which are viewed through eye pieces having decoding polarizing filters and prisms, preferably of a Fresnel type, to fuse the images at the fovea centralis of the eyes.

In the prior stereoscopic applications of Fresnel prisms, it has been desirable to obtain refraction and magnification of the stereoscopic images as the magnification of the images enhances the three dimensional illusion. Attempts to achieve simultaneous refracting and magnifying of stereoscopic images has not been achieved with a single prism without objectionable image distortion.

BRIEF STATEMENT OF THE INVENTION

This invention comprises a thin plate prism of the Fresnel type having refracting and magnifying properties. For this purpose, one face of the prism is formed with a plurality of straight line, parallel and evenly spaced triangular prisms and the opposite face of the element has a plurality of coaxial, arcuate prisms of varied face angles in a progressive order of decreasing face angles extending outwardly from the center of the optical element. The arcuate prisms can be a single, continuous helical prism with a continuously variable and decreasing face angle along its length from the center of the element or, preferably, can be a plurality of concentric circular prisms of incrementally increasing diameter and decreasing face angles. One face of the prism thus functions as a magnification element while the other face of the prism functions to refract the stereoscopic images the necessary degree for fusing of these images into a single three dimensional illusion.

The stereoscopic viewing system of the invention utilizes the aforementioned thin plate optical element, which is positioned in front of a display of the stereoscopic images which are viewed through a pair of eyepieces with the necessary optical elements for creating the three dimensional illusion.

BRIEF DESCRIPTION OF THE DRAWINGS

The invention will be described with reference to the FIGS., of which:

FIG. 4 is a view along lines 4—4 of FIG. 3;.

FIGS. 5, 6 and 7 are enlarged views of the areas within lines 5—5, 6—6 and 7—7, respectively, of FIG. 4;

FIG. 8 is a view of the magnifying face of another optical element useful in the invention;

FIG. 9 is a sectional view of another optical element of the invention;

FIGS. 10, 11 and 12 are enlarged views of the areas within lines 10—10, 11—11 and 12—12 of FIG. 9; and FIG. 13 is a perspective view of the optical element as used in a stereoscopic viewing system.

DESCRIPTION OF PREFERRED EMBODIMENTS

Figure 1:
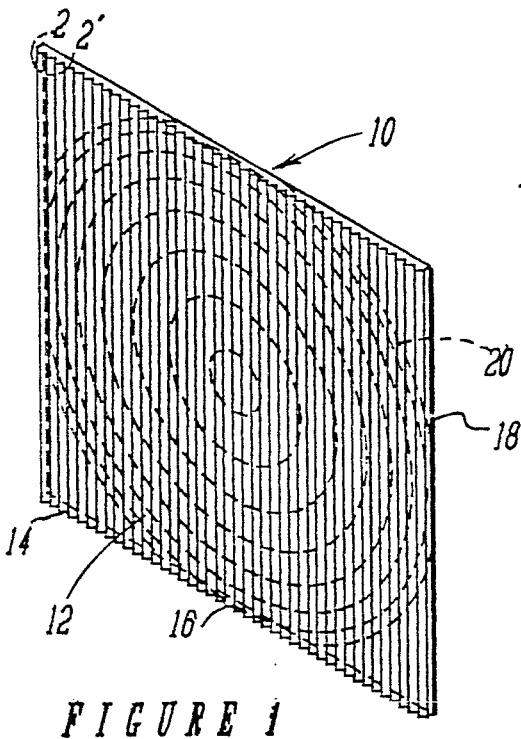
FIG. 1 is a perspective view of the optical element of the invention.
Figure 2:
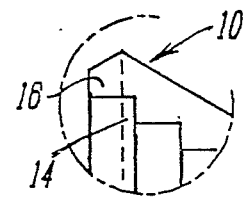
FIG. 2 is an enlarged view of the area within line 2—2 of FIG. 1.

Referring now to FIGS. 1 and 2, the optical element 10 of the invention is shown as a thin plate formed of a suitable optically transparent material, e.g., glass, polycarbonate, polymethylmethacrylate, or blends of the two latter plastics. Preferably the element is formed of the aforementioned plastics for lightness in weight and cost, particularly as these resins can be molded into optically acceptable elements.

The optical element 10 has a refracting face 12 which is formed by a plurality of V-grooves 14 that extend in parallel and evenly spaced array across the face 12 of the element 10. These V-grooves 14 form a plurality of parallel, triangular prisms 16 in evenly spaced array across the face 12 of the optical element 10.

The prisms are spaced at a density of from 20 to 200 prisms per.inch, preferably from 50 to about 125 prisms per inch as this density provides the optimum resolution of the images while permitting manufacture at acceptable costs. The face angle of the prisms can be varied from about 30 to about 120 degrees, preferably from about 60 to about 120 degrees and, most preferably 90 degrees. Because of the very close spacing of these prisms, they cannot be accurately depicted on the drawings, which illustrate such prisms at considerably lesser densities than would be present in actual practice. The drawings, however, illustrate the shapes and forms of the prisms.

On its opposite face 18 the optical element 10 has a plurality of coaxial arcuate prisms 20 which are shown in hidden object lines. The arcuate prisms 20 are provided with face angles to achieve magnification of the object in a manner hereinafter described.

Figure 3:
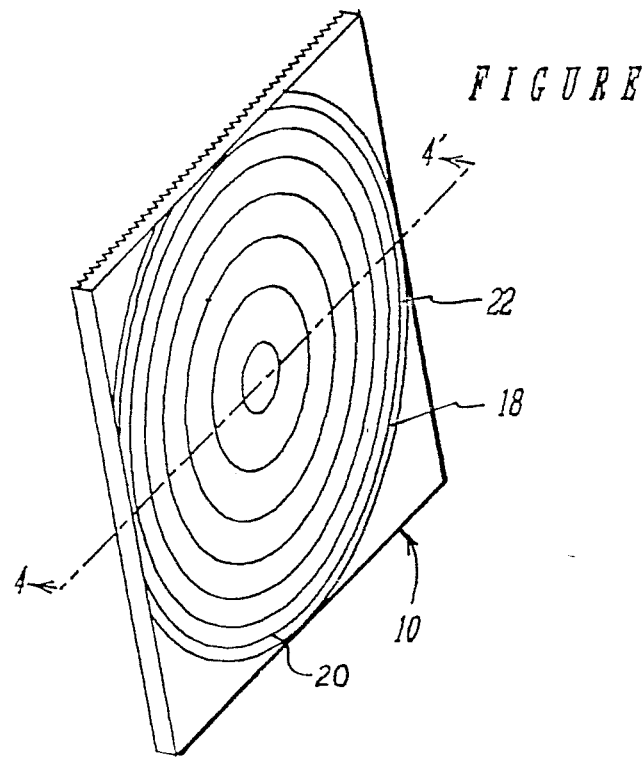
FIG. 3 is a view of the opposite face of the optical element of FIG. 1.

Referring now to FIG. 3, the opposite face 18 of the optical element 10 is shown. As there illustrated, the opposite face 18 has a plurality of concentric, V-shaped grooves 22 which are formed on the face 18 to form a plurality of concentric, circular prisms 20. Preferably the prisms 20 are spaced with densities from about 20 to 200 prisms per inch, preferably from 50 to 120 prisms per inch. The prisms are formed with a prism face angle which is from 10 to about 170 degrees and which progressively decreases in value from the center of the element outwardly. As with FIGS. 1 and 2, the drawing only depicts the shape and form of these prisms, as they are spaced too closely together for precise depiction in the drawings. Also, the prisms extend fully to the corners, entirely covering the face 18 of the plate, but these are omitted to simplify the illustration.

Referring now to FIG. 4, the optical element 10 is shown in cross sectional view. As the prisms 16 and 20 are very closely spaced and are of relatively shallow depth, e.g., from about 0.01 to about 0.1 inch, the profile of the prisms is not readily apparent in the cross sectional view. The profile of the prisms, however, is illustrated by the enlarged views, FIGS. 5, 6 and 7. The plate 10 is also quite thin, typically with a thickness from 0.1 to about 0.5 inch, preferably from about 0.125 to 0.25 inch.

As shown in FIGS. 5-7, the arcuate prisms 20 are spaced across the face 18 of the optical element at progressive decreasing distances extending outwardly from the center 24. The result is that the face angles of the arcuate prisms 20 progressively decrease as the diameters of the prisms increases. A comparison of FIGS. 5 and 7 to FIG. 6 reveals that the circular prism 26 at the center 24 of the face 18 has a relatively large face angle, e.g., about 150 degrees, and that the face angles of the circular prisms progressively decrease to a very small angle, e.g., about 8 degrees at the outer extremities 30 of face 18. The depth of the circular V-grooves 22 in the opposite face 18 is constant across the face of the optical element 10 and the progressive decrease in face angle is achieved by a progressive decrease in the spacings between adjacent arcuate prisms on the face 18.

Referring now to FIG. 8, there is illustrated an alternative embodiment of the invention in which the face 32 of the optical element 34 bears a single helical or spiral V-groove 36, thereby forming a continuous helical prism 38. The opposite, or refracting, face of the optical element 34 is substantially identical to the face 12 previously described for the optical element 10 shown in FIGS. 1-7.

The sectional view for optical element 34 is the same as that for optical element 10, which is shown in FIGS. 4-7.

The progressive increase in face angle of the prisms can also be achieved by maintaining equal spacing between adjacent arcs of the arcuate prisms and by increasing the heights of those prisms. A cross section of such an optical element 35 is shown in sectional view in FIG. 9 and in enlarged sectional views in FIGS. 10-12. The arcuate prisms 39 can be concentric circular prisms, such as shown in FIG. 2, or a continuous helical prism, such as shown in FIG. 8. The annular spacings between adjacent arcs of the prisms will, however, be equal across the entire face of the optical element. As with the optical element 10 shown and described with reference to FIG. 4, the arcuate prisms 39 of this element have progressively decreasing face angles extending outwardly from its center 44. This variation in face angles is provided by increasing the depth of the V-grooves 41 which form the prisms 39 in an outward direction from the center 44 of face 33 of the optical element 35 towards its outer edges 37.

As illustrated in the enlarged views, FIGS. 10, 11 and 12 the arcuate prisms 39 have a progressively increasing height with the annular distances between adjacent arcs of the arcuate prisms 39 being constant across the face 33 of the optical element 35. This results in a progressive decrease in the face angle of the arcuate prisms 39 extending outwardly from the center 44 of the face 33 to the laterally outermost edges 37 of the face.

On the opposite face 48, the refraction prisms 16 are identical and parallel triangular prisms with equal face angles and are disposed at equal spacings or densities across the entire face of the optical element, all as described with reference to FIGS. 1-7 for the same elements of optical element 10.

The variations in depth, or alternatively in spacings, between adjacent arcs of the arcuate prisms described and illustrated for optical elements of this invention can be used interchangeably. Thus a plurality of concentric circular prisms can be provided at equal annular spacings, but with increasing depths in an outward direction from the center. Similarly, a helical prism can be provided with a constant depth, but with the distance between its adjacent arcs decreasing in a progressive manner as it extends outwardly from the center.

Referring now to FIG. 13, the invention of a stereoscopic system with the optical element shown in FIGS. 1-12 is illustrated as including a screen 50 which can be a typical movie or slide projection screen or can be the screen of a television receiver, television projection screen or a backlighted X-ray or photographic transparency lightbox, and the like. Left stereoscopic image 52 and right stereoscopic image 54 are projected, or displayed, on screen 50. As illustrated in FIG. 1, left image 52 and right image 54 are projected or displayed on screen 50 with no prior encoding of any kind, and are encoded by filter 56 which is positioned in front of screen 50. Filter 56 comprises two, side-by-side elements, which are left element 58 and right element 60. The elements can be red and green filters respectively, or two orthogonally opposed polarizing filters. Thus the left image 52 could be displayed for observance through left polarizing filter 58 via polarized light aligned along the vertical axis, while right image 54 could be displayed for observance through right polarizing filter 60 via polarized light aligned along the horizontal axis.

Alternatively, the left stereoscopic image 52 can be encoded using a monochromatic light filter such as a red filter while the right stereoscopic image can be encoded with a monochromatic blue light filter. Regardless of the encoding technique employed, the observer 62 utilizes corresponding decoding filters, as hereinafter described, to confine the vision of each of the observer's eyes to its respective left or right stereoscopic image.

The left and right stereoscopic images are fused into a unitary image 64 by the refraction prisms such as the triangular prisms 16 (see FIGS. 1 and 2), of the optical element 66 which is positioned a slight distance A in front of the screen 50. The refraction prisms 16 of the optical element fuse the left and right stereoscopic images into the unitary image 68 which appears in space near the face of the optical element. The optical element 66 is the thin face element as described and illustrated in FIGS. 1-7 or FIGS. 8-12 and has a refraction face with a plurality of substantially parallel V-grooves which subdivide the faceted face into a plurality of prisms having a triangular cross-section. In the illustrated, preferred embodiment, the V-grooves are a plurality of substantially parallel, vertical grooves extending across the entire face of the prism. Also in the preferred embodiment, these V-grooves are evenly spaced to provide, therebetween, evenly spaced, triangular prisms. On its opposite face 18, the optical element has a plurality of arcuate prisms (not shown) of varied face angle, decreasing in value in a laterally outward direction from the center, all as previously described.

The remainder of the viewing system of FIG. 13 includes the decoding filters 70 and 72. In the application illustrated herein, the decoding filters are supported as left and right filters and which are carried in the lens frame 74 of a binocular set of glasses 76. When polarized light is the encoding medium, each filter and is polarized in the same direction as the polarized light corresponding to its projected image, thus the observer's left eye perceives only the left stereoscopic image contribution to the fused image and similarly, the observer's right eye perceives only the optical information from the right stereoscopic image which appears in the fused image. This can readily be achieved with conventional polarizing light projecting and filtering systems and this constitutes a preferred embodiment of the invention. For illustration purposes, polarized light filters are depicted by vertical and horizontal shading of filters and respectively. Such shading would not appear on the filters, which instead would be smooth surfaced transparent sheets such as depicted for the encoding filters 58 and 60. Alternatively, although less preferred, is the use of colored filters of monochromatic wave length, e.g., a red filter for the left eye and blue filter for the right eye, corresponding to similar monochromatic light encoding of the left and right stereoscopic images, respectively.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A thin plate optical element formed entirely of optically transparent material as an integral, single element and having:
   a. an integral prism face to effect refraction and comprising a plurality of straight and parallel closely spaced prisms of face angles from 35 to 135 degrees;
   b. an opposite integral face to effect magnification and comprising a plurality of concentric and geometrically spaced circular prisms of face angles from 30 to 170 degrees with progressively decreasing face angles and progressively increasing heights in a medial direction outwardly from the center of said face.

2. The thin plate optical element of claim 1 wherein said straight prisms are spaced at equal, regular spacing from 20 to 250 prisms per inch.

3. The thin plate optical element of claim 2 wherein said spacing is from 50 to 150 prisms per inch.

4. The thin plate optical element of claim 1 wherein said circular prisms are spaced at equal, regular spacing from 20 to 250 prisms per inch.

5. The thin plate optical element of claim 4 wherein said spacing is from 50 to 150 prisms per inch.

6. The combination of the thin plate optical element of claim 1 in a stereoscopic viewing system comprising:
   a. an imaging surface on which left and right stereoscopic images are displayed in adjacent array;
   b. light encoding means to encode said images with left and right image information;
   c. said thin plate optical element of claim 1 being positioned a distance in front of said imaging surface to magnify and fuse the right and left images; and
   d. an optical decoding filter medium for placement in front of an observer to decode said left and right stereoscopic images and confine the transmission of each of said left and right images to the respective left and right eye of said observer.

7. The combination of claim 6 wherein said encoding means is positioned between said imaging surface and said thin face optical element.

8. The combination of claim 7 wherein said encoding means comprises monochromatic light filters of preselected first and second colors.

9. The combination of claim 7 wherein said encoding means comprises a pair of polarizing light filters mounted with their light polarizing directions orthogonal to each other.

10. A thin plate optical element formed entirely of optically transparent material as an integral, single element and having:
    a. an integral prism face to effect refraction and comprising a plurality of straight and parallel closely spaced prisms of face angles from 35 to 135 degrees;
    b. an opposite integral face to effect magnification and comprising a plurality of concentric and geometrically spaced circular prisms of face angles from 30 to 270 degrees with progressively decreasing face angles, and progressively decreasing spacing between adjacent prisms in a medial direction outwardly from the center of said face.

11. A thin plate optical element formed entirely of optically transparent material as an integral, single element and having:
    a. an integral prism face to effect refraction and comprising a plurality of straight and parallel closely spaced prisms of face angles from 35 to 135 degrees;
    b. an integral opposite face to effect magnification and comprising a continuous helical prism having a continuously variable face angle between 30 and 170 degrees and decreasing progressively along its path, and a progressively increasing height outwardly from its center.

12. The combination of the thin plate optical element of claim 11 in a stereoscopic viewing system comprising:
    a. an imaging surface on which left and right stereoscopic images are displayed in adjacent array;
    b. light encoding means to encode said images with left and right image information;
    c. said thin plate optical element of claim 11 being positioned a distance in front of said imaging surface to magnify and fuse the right and left images; and d. an optical decoding filter medium for placement in front of an observer to decode said left and right stereoscopic images and confine the transmission of each of said left and right images to the respective left and right eye of said observer.

13. The combination of claim 12 wherein said encoding means is positioned between said imaging surface and said thin face optical element.

14. The combination of claim 13 wherein said encoding means comprises monochromatic light filters of preselected first and second colors.

15. The combination of claim 13 wherein said encoding means comprises a pair of polarizing light filters mounted with their light polarizing directions orthogonal to each other.

16. A thin plate optical element formed entirely of optically transparent material as an integral, single element and having:
   a. an integral prism face to effect refraction and comprising a plurality of straight and parallel closely spaced prisms of face angles from 35 to 135 degrees;
   b. an integral opposite face to effect magnification and comprising a continuous helical prism having a continuously variable face angle between 30 and 170 degrees and decreasing progressively along its path outwardly from its center, and a progressively increasing radius to provide a decreasing spacing between adjacent arcs of said helical prism along its path outwardly from its center.

* * * * *